July 24, 1956

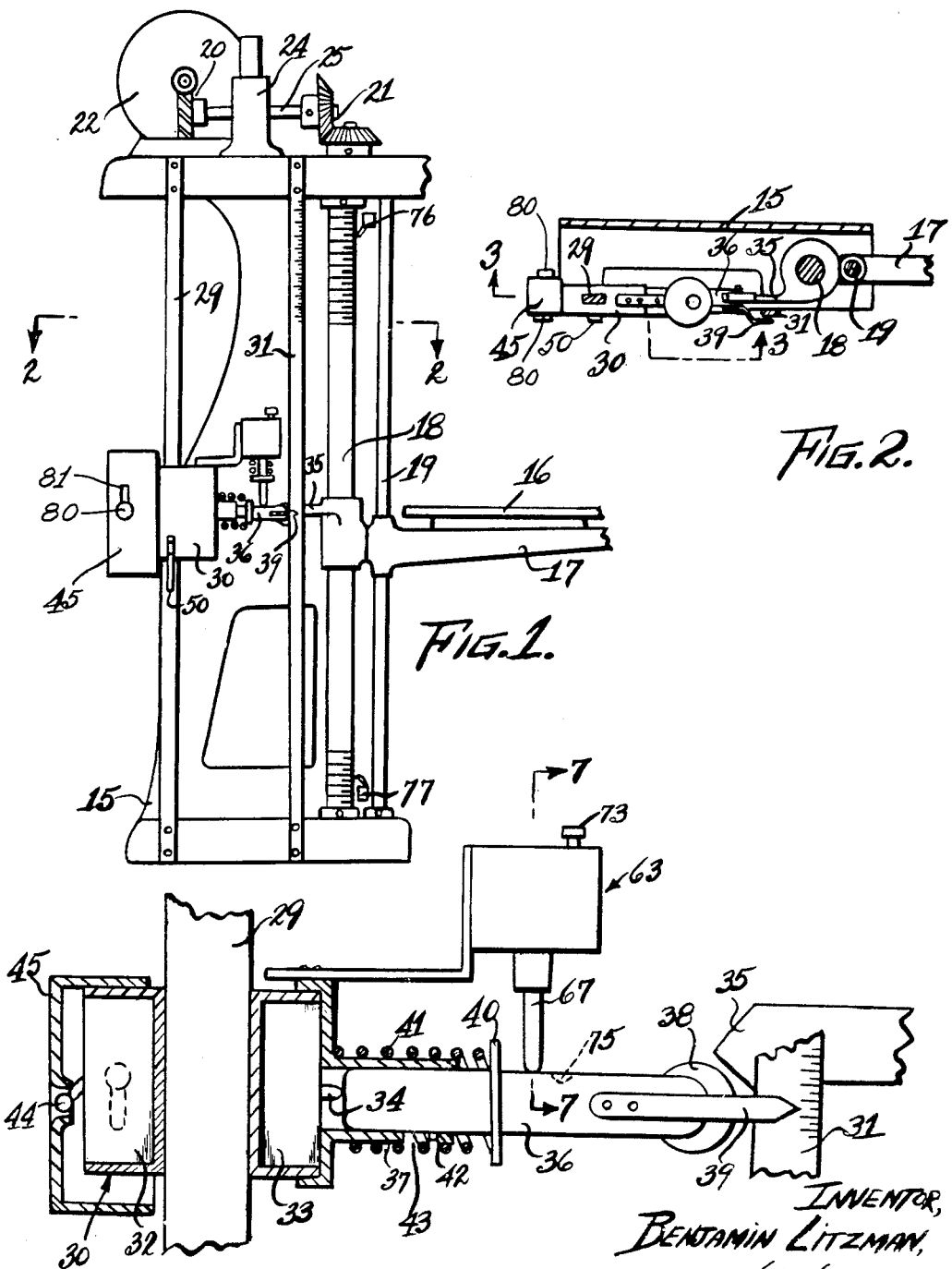

B. LITZMAN 2,756,377

ELECTRIC MOTOR SYSTEM FOR STOPPING
DRIVEN MEMBER AT SELECTED POSITION

Filed July 12, 1955

INVENTOR,
BENJAMIN LITZMAN,
BY
ATTORNEY

United States Patent Office 2,756,377
Patented July 24, 1956

2,756,377

ELECTRIC MOTOR SYSTEM FOR STOPPING DRIVEN MEMBER AT SELECTED POSITION

Benjamin Litzman, New York, N. Y.

Application July 12, 1955, Serial No. 521,467

12 Claims. (Cl. 318—265)

The present invention relates to apparatus for automatically shifting a movable member to any desired position in its defined locus of travel which may be along a straight line or about an axis of rotation. As examples, this invention is applicable to control the movement of for instance, the work-holding table of a photostat machine or drill press, the tool carriage of machine tools, or the extent of movement of a turntable about its axis. In particular, this invention utilizes an electric motor and control means therefor, to operate such shifting apparatus.

The principal object of this invention is to provide novel and improved apparatus of the character mentioned, where all the operator has to do, is to move a slide along a track to a position thereon indicative of the desired position the work table or other movable member is to assume, whereupon the required positioning of such table or the movable member concerned, will be automatically accomplished.

A further object hereof is to provide novel and improved apparatus of the nature set forth, permitting the operator to change the position of the slide while the table or such is being moved towards a position set by error, where the new slide position requires reversal of movement of said table. In such instance, the table will stop and proceed to the position determined by the new setting of the slide, without any further movement towards the position it was erroneously sent to initially.

Another object of this invention is to provide novel and improved apparatus of the nature described, which is fully automatic in its operation after the operator has set the slide and which is reasonably cheap to manufacture and efficient in carrying out the purposes for which it is designed.

Other objects and advantages will become apparent as this disclosure proceeds.

For the practice of this invention, the work table or other movable member to be controlled, carries a trip. There is a track along which a slide is movable and capable of being set at positions therealong. The slide carries a reversing switch to control the direction of rotation of the motor shaft. This shaft operates mechanism to shift the work table or other movable member concerned. The slide also carries a normally closed switch interposed electrically in the motor circuit. The operating member of this last mentioned switch is in the locus of movement of said trip. On the slide, there is a movable element which serves as the grip for said slide. This element is shiftable on the slide to and fro along the track and is connected to the operating member of the reversing switch. Graduations are preferably provided along the track for the slide. Shifting of the slide along its track by hold on its grip element will automatically correctly set the reversing switch. When the work table reaches its required destination, the trip thereon will engage the operating member of the normally closed switch and set it in open condition. An electrically operated brake is employed to arrest the momentum of the motor when motor circuit is opened and I also prefer to have a time delay device to accomplish quick motor reversal as becomes necessary upon resetting of the slide to require reversal of table travel. I will now proceed to described and explain this invention in greater detail.

In the accompanying drawings forming part of this specification, similar characters of reference indicate corresponding parts in all the views.

Fig. 1 is a fragmentary side elevation of a machine having an adjustably positionable work-holding table associated with apparatus to control its movement in accordance with the teachings of this invention. The showing here may be deemed part of a photostat machine. The work-holding table moves along a straight line.

Fig. 2 is a section taken at lines 2—2 in Fig. 1.

Fig. 3 is an enlarged section taken at lines 3—3 in Fig. 2.

Figure 5:
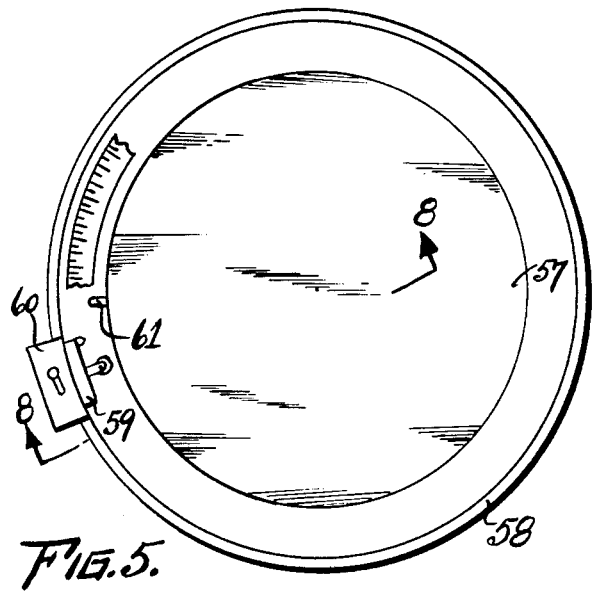
Fig. 5 is a top plan view of a turntable employing the teachings of this invention.

In the drawings, the numeral 15 designates an upright frame of for instance, a photostat machine whose work-holding table 16 is carried on a movable arm 17 which rides vertically on a rotatable screw shaft 18 and on the track bar 19. Said arm terminates in a threaded nut engaged on said journalled screw shaft. It is evident that upon rotation of said screw shaft 18, said arm 17 and the table 16 it carries will move upwards or downwards depending upon the direction of rotation of said screw shaft. By means of a system of gearing shown at 20, 21, the electric motor 22 is adapted to drive the screw shaft 18. A brake 23, operated by a solenoid 24 is used to act on a shaft included in the motor drive, as for instance indicated by the numeral 25. This brake may comprise a ring of larger diameter than that of the shaft 25 which it encircles. Such ring 26 is interiorly lined with suitable friction-offering material 27, is on the movable core of the solenoid 24 and is biased by a spring 28 which normally holds the brake "on." Said brake is operated to be "off" when the motor circuit is closed.

Parallel to the screw shaft 18, there are the track bar 29 for the slide indicated generally as 30, and the graduated bar 31 for setting the slide to any position it is desired that the work-holding table 16 shall assume. Said slide 30 holds a reversing switch 32 and a normally closed switch 33. These switches are for the control of the operation of the motor 22.

The operating member of the switch 33 may be the spring-pressed button 34 which needs to be operated by the trip element extending as a finger 35 from the movable bracket or carriage 17, laterally to the line of movement of said carriage. In the embodiment illustrated, mechanical considerations require the button 34 to be some distance from the trip finger 35. So a push rod 36 is provided to serve as an extension of the said button with which it is in constant contact, though separate therefrom. This push rod is slidably supported in a bearing 37 on the slide 30, terminates at its outer end in a roller 38 which is in the locus of movement of the trip finger 35, carries a pointer 39 along the graduated bar 31 and such push rod carries a collar 40 exterior the bearing 37. A tensed compression coil spring 41 is mounted as shown, to act to push the push rod towards the screw shaft 18. A pin 42 extending from said push rod and slidable in slot 43, limits the movement of such rod outwardly of its bearing 37. The trip finger 35 and the roller 38 are behind the plane of the rear of the graduated bar 31 so as not to obstruct easy reading of the pointer 39 along said graduated bar. The switches 32 and 33 may be of the type commonly called "microswitches." The operating member 44 of the reversing switch 32 is engaged by a member 45 which is mounted on the slide 30, for movement to and fro thereon along the line of movement of such slide. It is best that said member 45 shall substantially encase the slide so that such slide 30 could be moved only by gripping said member 45. It is evident that if the reversing switch 32 is not already properly set for the required motor rotation upon movement of the slide along the track bar 29, that the gripping member 45 will first be moved to set the reversing switch 32 before the slide 30 will move.

Figure 4:
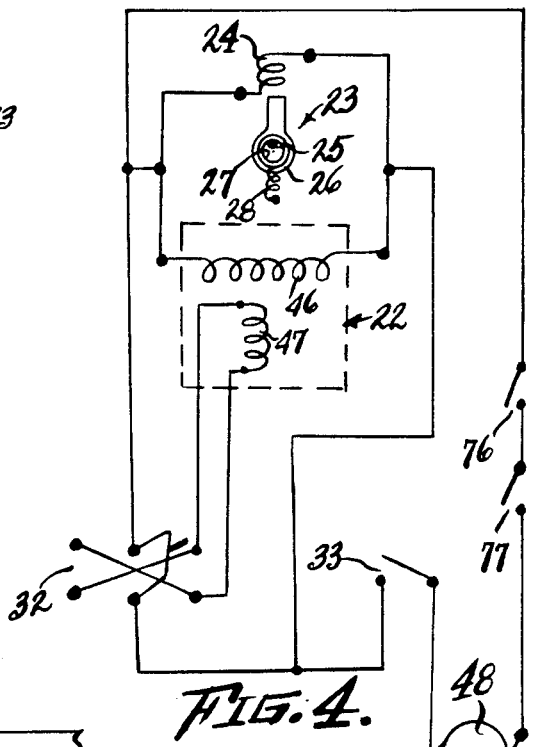
Fig. 4 is a diagrammatic showing of the electrical circuit employed for control of the operation of the motor which drives the mechanism for shifting the work-holding table.
Figure 8:
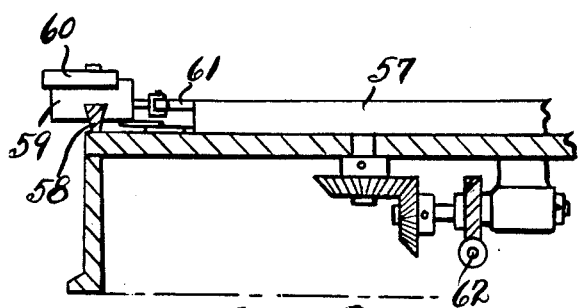
Fig. 8 is a section taken at lines 8—8 in Fig. 5.

In the electrical circuit diagram of Fig. 4, the motor 22 is A. C. and of the type including a field coil 46 and a starting coil 47; the latter being arranged with the reversing switch 32 in known fashion. The circuit is powered by a source of electrical energy 48 and switch 33 is interposed in the motor circuit. The brake-operating solenoid 24 is in parallel electrical connection with the motor's field coil 46, so that such solenoid is operated to release the brake 23 while the motor circuit is closed. As mentioned, the switch 33 is normally in closed condition. The trip finger 35, when engaged by the push rod 36, causes said rod to shift to open the switch 33. In such condition, as shown in Fig. 1, the motor 22 is at rest and solenoid 24 is deactuated. The brake ring 26 is in engagement with the shaft 25. The reversing switch 32 is in position to cause motor rotation for raising the work-holding table supporting bracket or arm 17. The trip finger 35 is in contact with the roller 38. The push rod 36 is in its inward position towards the switch 33.

If it is now desired to raise the table to a determined position, the member 45 is gripped in hand and slid upwardly until the pointer 39 indicates the desired height reading on the graduated bar 31. The slide may be provided with a spring 50 to set it in place along its track bar 29. As soon as the slide has moved away from its rest position shown in Fig. 1, the push rod 36 will be free of the trip finger 35, and switch 33 will close the motor circuit and actuate the solenoid 24 to release the brake ring 26 from its hold on the shaft 25. The table will rise until trip finger 35 engages the push rod 36, whereupon switch 33 will open and the table be at rest.

To lower the table 16 to any desired position, the member 45 is gripped in hand and moved downwards. If the reversing switch is not already in proper position for downward movement of the table, the member 45 will first move downward on the slide 30 thereby setting the reversing switch 32 to reverse the motor direction. Holding grip member 45 in hand which is moved downwards, the slide 30 is brought to where the pointer 39 is at the required height reading on the graduated bar 31. It is evident that the table 16 will be moved by motor operation and come to rest at the new setting therefor; the brake 23 acting to quickly halt motor operation upon the opening of the switch 33 by the trip finger 35. It is evident that if successive settings are for movement of the table in the same direction, the switch 32 as mentioned, is already set in its required condition and manual movement of the member 45 will immediately move the slide 30, for there would be no independent movement of said member 45 on such slide. It might here be indicated that the scope of movement of member 45 on the slide 30 and the assembly of such parts may be attained by the headed pin 80 extending from the slide and through the slot 81 of predetermined length in member 45.

In making a setting of the slide 30 so that the pointer 39 be at a required reading on bar 31, it is evident that the operator may have to "edge" back and forth for he may go beyond the required setting. Reversal of movement of the slide, would occasion reversal of movement of the grip member 45 first of all, and of course, same would occasion operating the reversing switch 32, while the motor is running. Such action while the motor is running would not effect single phase A. C. motors having a starting switch, which would continue to run in the direction they commenced from rest. The same is not true of direct current motors without some alteration in their structure which is well known in the electrical art, but needs no discussion here.

If it is intended that all settings of the slide 30 shall be true without "edging" then any type of motor, A. C., or D. C., may be utilized herein. But since the capability of "edging" is desirable, the use of the particularly mentioned A. C. motor is preferred for this apparatus, meaning one of the type which will continue in the direction of rotation it commenced from rest, regardless of operation of the reversing switch while such motor is operating.

Figure 7:
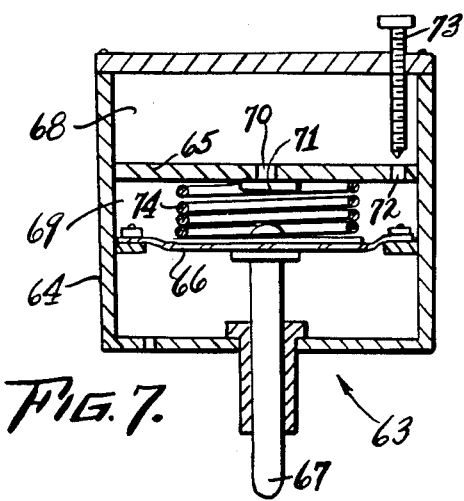
Fig. 7 is a section taken at lines 7—7 in Fig. 3, showing a delay device which may be employed in conjunction with the apparatus and serves to effect motor reversal properly. This view is enlarged.

If the operator intends to raise the table, but makes the mistake of shifting the slide downwards, or vice versa, it becomes mandatory that upon setting the slide 30 to the intended position, that the motor shall reverse. This can only be accomplished by having the motor come to rest. In the event of the making of such mentioned mistake, it is evident that in moving the slide to the intended position, that the finger 35 in intercepting the roller 38, will cause the switch 33 to open momentarily. I therefore provide that said switch shall remain open a sufficient time for the motor 22 to come to rest. For this purpose, I include a device indicated generally by the numeral 63, which will act to delay the closing of said switch 33, once such switch is opened. One construction for such a delay device is shown in Fig. 7, where a casing 64, is divided by two spaced partitions 65 and 66, to create the chamebrs indicated by the numerals 68 and 69. The partition 66 is a flexible, resilient membrane carrying a stud 67 which is slidably mounted through the wall of the casing 64, extends from said casing and bears against the pusher rod 36. Chamber 69 is filled with a suitable liquid which can enter chamber 68 through the orifice 72 controlled by the valve screw 73, and return through the check valve afforded by 70, 71. The numeral 74 is a tensed compression spring within the chamber 69, acting to bias the membrane 66.

All of chamber 69 and part of chamber 68 being filled with liquid, the delay device 63 operates as follows. While finger 35 does not act to open the switch 33, meaning the condition shown in Fig. 3, the pin 67 is in its raised position within casing 64. As soon as the finger 35 acts to push the bar 36 to open the switch 33, spring 41 is stressed, and pin 67 will enter the socket 75 due to action of the tensed spring 74 which bends the membrane 66 downward and causes an air space in the top of the chamber 69. This space is quickly filled with liquid flowing from chamber 68 through the check valve 71. The spring 41 being stronger than the spring 74, bar 36 will be urged to the right, to shift the rounded tip of pin 67 out of its socket. Since the said pin needs to be raised to again assume its position as in Fig. 3, the membrane 66 will also be raised and cause liquid to flow through the adjustably controlled orifice 72, from the chamber 69 into chamber 68. This will require some time to elapse before the switch 33 is again in closed condition and hence there will be sufficient time for the motor 22 to be stopped and reversed if the slide 30 had been shifted in the wrong direction and then shifted in opposite direction past the finger 35.

For safety, to stop the motor 22 if the table 16 had reached the limits of its scope of travel along the screw shaft 18, it is advisable to include the normally closed switches 76 and 77 at such upper and lower limits respectively, as shown, to be opened upon contact with the arm 17.

Figure 6:
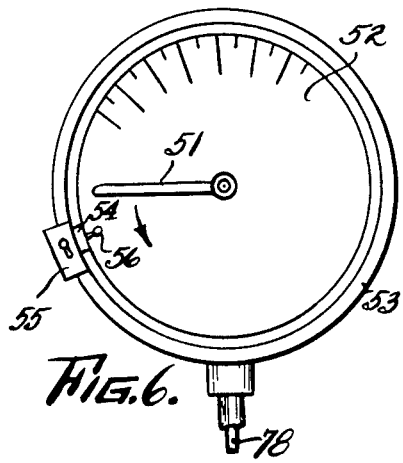
Fig. 6 shows another modification of this invention, wherein a rotatably mounted pointer moves over a dial graduated to indicate the position of the member of the machine to be shifted.

There are known devices where the position of a movable table or carriage along a track is indicated by a revolvable or swingable pointer 51 on a graduated scale 52 as shown in Fig. 6; the pointer being moved for instance by suitable reduction gearing, not shown, driven by the screw shaft 18 and driving the shaft 78. For such installation, the present invention may be employed by having a circular track 53 around the dial 52, on which track there is a slide 54 and the gripping member 55, movable along such slide along the direction of the track 53. Such slide 53 and gripping member 55, have the same general scheme of structure and function as that described for the embodiment shown in Fig. 3. The pointer 51 of course serves as the trip finger to operate with the push rod 56, and the motor driven apparatus is included in this modified set-up. Those versed in the machine art will readily understand this modified construction without further explanation or illustration. Likewise, this invention is applicable to control the extent and direction of rotation of a turntable 57. Here, the circular track is indicated by the numeral 58. The numeral 59 denotes the slide thereon akin to 30, and 60 is the gripping member. The trip finger 61 is carried on the turntable 57. The numeral 62 indicates the motor shaft. In view of the explanation already given for the embodiment shown in Fig. 1, the manner of operation of the modified embodiments is evident.

It is to be noted that for the system described herein to work properly, the gripping member 45 should be easier to slide on the slide 30 than it is to move such slide along the track 29. The same applies to the other embodiments taught herein.

This invention is capable of numerous forms and various applications without departing from the essential features herein disclosed. It is therefore intended and desired that the patent shall cover all patentable novelty herein set forth and that the embodiments herein shall be deemed merely illustrative and not restrictive; reference being had to the following claims rather than to the specific description herein to indicate the scope of this invention.

I claim:

1. In a system for driving a movably mounted member to a selected position on its path of travel, a reversible electric motor, means associated with said motor and member for moving said member along its path upon actuation of the motor, a current source of supply, a circuit connecting said source with the motor, a reversing switch in said motor circuit for selectively effecting operation of said motor in opposite directions, a normally closed switch in said motor circuit; each of said switches having an operating element respectively, a track, a slide slidably mounted on said track for movement therealong; the operating elements of both said switches being carried on said slide, an element adapted to be gripped in hand, movably mounted on said slide in the direction of the track; movement of said gripping element on the slide causing no movement of the slide along the track; the operating element of the reversing switch being engaged by said gripping element whereupon movement of said gripping element on the slide in one direction, the reversing switch will be set in condition to operate the motor in clockwise direction and upon movement of said gripping element in the opposite direction on the slide, the reversing switch will be set in condition to operate the motor in counter-clockwise direction, a trip mounted for movement along the track and means maintaining said trip at such position along the track as is indicative of the position of said member along its path of travel; the operating element of the normally closed switch being in the path of said trip and adapted to be shifted thereby to open the normally closed switch; said trip being adapted to pass away from said operating element of the normally closed switch whereupon such switch again assumes its normally closed condition.

2. The system as defined in claim 1, wherein the mentioned path and track are each straight.

3. The system as defined in claim 1, wherein the mentioned path is straight and the track is circular.

4. The system as defined in claim 1, wherein the movement of the mentioned member is about an axis of rotation and the track is circular.

5. The system as defined in claim 1, wherein the trip is carried by the mentioned member.

6. The system as defined in claim 1, wherein the motor has the characteristic that upon setting the reversing switch to reverse the direction of operation of the motor while said motor is running, such motor will continue running in the same direction as it was running before the manipulation of said switch.

7. The system as defined in claim 6, including means adapted to delay the closing of the normally closed switch after the trip has set such switch into open condition and passed away from the operating element of such switch; such delay being sufficient for the motor to come to rest.

8. The system as defined in claim 7, including a brake holding the motor shaft against rotation while the motor circuit is open and electrically operated means in said motor circuit adapted to release said brake while the motor circuit is closed; the mentioned delay being sufficient for the brake to cause the motor shaft to come to rest.

9. The system as defined in claim 1, including a brake holding the motor shaft against rotation while the motor circuit is open and electrically operated means in said motor circuit adapted to release said brake while the motor circuit is closed.

10. The system as defined in claim 1, wherein the track has indicia thereon.

11. In combination, a track, a slide slidably mounted on the track for movement therealong, an element adapted to be gripped in hand, movably mounted on said slide whereby movement of said gripping element on the slide causes no movement of said slide along the track, an operating element of a device adapted for reversing the direction of rotation of a driven shaft, carried on said slide and engaged by said gripping element whereupon movement of said gripping element on the slide in one direction, said operating element will be shifted so that the shaft will be revolved clockwise and upon movement of said gripping element on the slide in the opposite direction, the shaft will be revolved in counterclockwise direction.

12. The combination as defined in claim 11, wherein the gripping element moves on the slide in the direction of the track.

No references cited.